(12) United States Patent
Li et al.

(10) Patent No.: US 12,256,388 B2
(45) Date of Patent: Mar. 18, 2025

(54) PHYSICAL UPLINK CONTROL CHANNEL SCHEDULING FOR ACK-NACK FEEDBACK IN MULTI-TRANSMISSION/RECEPTION POINT NON-COHERENT JOINT TRANSMISSIONS

(71) Applicant: QUALCOMM Incorporated, San Diego, CA (US)

(72) Inventors: Qiaoyu Li, Beijing (CN); Yu Zhang, Beijing (CN); Chenxi Hao, Beijing (CN); Liangming Wu, Beijing (CN); Hao Xu, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 646 days.

(21) Appl. No.: 17/275,573

(22) PCT Filed: Sep. 19, 2019

(86) PCT No.: PCT/CN2019/106586
§ 371 (c)(1),
(2) Date: Mar. 11, 2021

(87) PCT Pub. No.: WO2020/057580
PCT Pub. Date: Mar. 26, 2020

(65) Prior Publication Data
US 2021/0368496 A1  Nov. 25, 2021
US 2022/0183001 A9  Jun. 9, 2022

(30) Foreign Application Priority Data
Sep. 21, 2018  (WO) ................ PCT/CN2018/107087

(51) Int. Cl.
*H04W 72/21* (2023.01)
*H04L 5/00* (2006.01)
*H04W 72/0446* (2023.01)

(52) U.S. Cl.
CPC ........... *H04W 72/21* (2023.01); *H04L 5/0051* (2013.01); *H04W 72/0446* (2013.01)

(58) Field of Classification Search
CPC ............... H04W 72/04; H04W 72/044; H04W 72/0446; H04W 72/0453; H04W 72/0457;
(Continued)

(56) References Cited

U.S. PATENT DOCUMENTS

2013/0034073 A1*  2/2013  Aiba ................... H04W 52/325
                                                           370/329
2018/0167946 A1   6/2018  Si et al.
(Continued)

FOREIGN PATENT DOCUMENTS

CN   105850192 A   8/2016
CN   108365922 A   8/2018
(Continued)

OTHER PUBLICATIONS

Huawei, et al., "Enhancements on Multi-TRP/Panel Transmission in Nr", R1-1809117, 3GPP TSG RAN WG1 Meeting#94, Aug. 24, 2018 (Aug. 24, 2018), 10 Pages, see p. 7, section 2.3.3, URL: http://www.3gpp.org/ftp/tsg%5Fran/WG1%5FRL1/TSGR1%5F94/Docs/R1%201809117%2Ezip.
(Continued)

*Primary Examiner* — Peter Chen
(74) *Attorney, Agent, or Firm* — QUALCOMM Incorporated

(57) ABSTRACT

Certain aspects of the present disclosure provide techniques for scheduling hybrid automatic repeat request (HARQ) feedback and controlling the transmit power of the HARQ
(Continued)

feedback. An example method generally includes generating a configuration for physical uplink control channel (PUCCH) resource sets assigned to at least one user equipment (UE), wherein each of the PUCCH resources sets comprises PUCCH resources, transmitting the configuration for the PUCCH resource sets to the at least one UE, generating an uplink control reporting indication indicating the PUCCH resources associated with downlink demodulation reference signal (DMRS) port groups, transmitting the uplink control reporting indication, to the at least one UE, for use in reporting uplink control information (UCI), and receiving at least a part of the UCI associated with at least one of the downlink DMRS port groups from the at least one UE via the PUCCH resources indicated in the uplink control reporting indication.

20 Claims, 11 Drawing Sheets

(58) Field of Classification Search
CPC .......... H04W 72/046; H04W 72/0466; H04W 72/0473; H04W 72/20; H04W 72/21; H04W 72/23; H04W 72/231; H04W 72/232; H04W 72/25; H04W 72/27; H04W 72/1263; H04W 72/1268; H04W 72/1273; H04W 74/002; H04W 74/004; H04W 74/006; H04L 5/0016; H04L 5/0023; H04L 5/0048; H04L 5/005; H04L 5/0051; H04L 5/0053; H04L 5/0055; H04L 5/0057; H04L 5/0091; H04L 5/0092; H04L 5/0094; H04L 5/001
See application file for complete search history.

(56) References Cited

U.S. PATENT DOCUMENTS

| | | | |
|---|---|---|---|
| 2018/0192416 | A1 | 7/2018 | Yin et al. |
| 2021/0153188 | A1 | 5/2021 | Wang et al. |
| 2021/0204276 | A1 | 7/2021 | Ge et al. |
| 2021/0289489 | A1* | 9/2021 | Liu ................ H04W 72/21 |
| 2022/0060293 | A1* | 2/2022 | Matsumura ........... H04L 1/1896 |

FOREIGN PATENT DOCUMENTS

| | | | |
|---|---|---|---|
| WO | 2018106075 | A1 | 6/2018 |
| WO | 2020024756 | A1 | 2/2020 |
| WO | 2020053978 | A1 | 3/2020 |
| WO | 2020057404 | A1 | 3/2020 |

OTHER PUBLICATIONS

International Search Report and Written Opinion—PCT/CN2018/107087—ISA/EPO—Jun. 12, 2019.
International Search Report and Written Opinion—PCT/CN2019/106586—ISA/EPO—Nov. 27, 2019.
OPPO: "Offline Summary on Maintenance for R15 NR PUCCH Resource", R1-1809827 3GPP TSG RAN WG1 Meeting #94, Aug. 24, 2018 (Aug. 24, 2018), 7 Pages, see pp. 1 to 4, Sections 1 to 3.
VIVO: "Remaining Issues on UL Power Control", R1-1808228, 3GPP TSG RAN WG1 Meeting #94, Aug. 24, 2018 (Aug. 24, 2018), 4 Pages, see pp. 1-3, section 2.
ASUSTEK: "Discussion on Multi-TRP DL Transmission", 3GPP TSG RAN WG1 Meeting NR#3, 3GPP Draft, R1-1716546, Discussion on Multi-TRP DL Transmission, 3rd Generation Partnership Project (3GPP), Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 17, 2017 (Sep. 17, 2017), XP051339999, 3 Pages, Retrieved from the Internet: URL: http://www.3gpp.org/ftp/Meetings_3GPP_SYNC/RAN1/Docs/ [Retrieved on Sep. 17, 2017], Section 2.
CATT: "Considerations on DL Multi-Panel and Multi-TRP Transmission", 3GPP Draft, 3GPP TSG RAN WG1 Meeting NR#3, R1-1715798, Considerations on DL Multi-Panel and Multi-TRP Transmission, 3rd Generation Partnership Project (3GPP), Mobile Competence Centre, 650, Route Des Lucioles, F-06921 Sophia-Antip, vol. RAN WG1, No. Nagoya, Japan, Sep. 18, 2017-Sep. 21, 2017, Sep. 17, 2017 (Sep. 17, 2017), XP051339258, 4 Pages, Retrieved from the Internet: URL: http://www.3gpp.org/ftp/Meetings_3GPP_SYNC/RAN1/Docs/ [Retrieved on Sep. 17, 2017] Sections 1-6.
Huawei, et al., "DL Multi-TRP/Panel Operation in R15", 3GPP Draft, 3GPP TSG RAN WG1 Meeting #92, R1-1802073, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 26, 2018-Mar. 2, 2018, Feb. 16, 2018 (Feb. 16, 2018), XP051397457, 3 pages, Retrieved from the Internet: URL: http://www.3gpp.org/ftp/tsg%5Fran/WG1%5FRL1/TSGR1%5F92/Docs/. [retrieved on Feb. 16, 2018] paragraph [02. 3].
Huawei, et al., "Solution and TP for Multi-TRP PDCCH Transmission", 3GPP Draft, 3GPP TSG RAN Wg 1 Ad Hoc Meeting, R1-1800824, 3GPP TSG RAN WG1 Ad Hoc Meeting, 3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018, XP051385096, 5 Pages, Retrieved from the Internet: URL: http://www.3gpp.org/ftp/tsg%5Fran/WG1%5FRL1/TSGR1%5FAH/NR%5FAH%5F1801/Docs/ [retrieved on Jan. 13, 2018] Paragraph [002]—Paragraph [02.5].
Supplementary European Search Report—EP19861786—Search Authority—The Hague—May 2, 2022.

* cited by examiner

PHYSICAL UPLINK CONTROL CHANNEL SCHEDULING FOR ACK-NACK FEEDBACK IN MULTI-TRANSMISSION/RECEPTION POINT NON-COHERENT JOINT TRANSMISSIONS

CROSS-REFERENCE TO RELATED APPLICATION(S)

This application is a national stage application under 35 U.S.C. 371 of PCT/CN2019/106586, filed Sep. 19, 2019, which claims benefit of and priority to International Application No. PCT/CN2018/107087, filed Sep. 21, 2018, which are both assigned to the assignee of the present application and hereby expressly incorporated by reference herein in their entireties.

BACKGROUND

Field of the Disclosure

Aspects of the present disclosure relate to wireless communications, and more particularly, to techniques for scheduling hybrid automatic repeat request (HARQ) feedback, via physical uplink control channel (PUCCH) resources, for multi-transmission/reception point (multi-TRP) non-coherent joint transmissions and/or controlling the transmit power of the HARQ feedback scheduled on one or more PUCCH resources.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between base stations and user equipment in a wireless network.

Certain aspects provide a method for wireless communication by a base station. The method generally includes generating a configuration for physical uplink control channel (PUCCH) resource sets assigned to at least one user equipment (UE), wherein each of the PUCCH resources sets comprises PUCCH resources, transmitting the configuration for the PUCCH resource sets to the at least one UE, generating an uplink control reporting indication indicating the PUCCH resources associated with downlink demodulation reference signal (DMRS) port groups, transmitting the uplink control reporting indication, to the at least one UE, for use in reporting uplink control information (UCI), and receiving at least a part of the UCI associated with at least one of the downlink DMRS port groups from the at least one UE via the PUCCH resources indicated in the uplink control reporting indication.

Certain aspects provide a method for wireless communication by a UE. The method generally includes obtaining a configuration for physical uplink control channel (PUCCH) resource sets, comprising PUCCH resources, and an uplink control reporting indication indicating the PUCCH resources associated with downlink demodulation reference signal (DMRS) port groups, determining the PUCCH resources associated with the downlink DMRS port groups for one or more parts of uplink control information (UCI) also associated with the downlink DMRS port groups based on the configuration for the PUCCH resource sets and the uplink control reporting indication, and reporting the one or more parts of the UCI to at least one base station using the determined PUCCH resources.

Certain aspects provide a method for wireless communication. The method generally includes determining a transmit power for physical uplink control channel (PUCCH) resources configured for at least one user equipment (UE), signaling an indication of the transmit power to the at least one UE for use in reporting uplink control information (UCI), and receiving the UCI from the at least one UE.

Certain aspects provide a method for wireless communication by a UE. The method generally includes obtaining an indication of one or more transmit powers for physical uplink control channel (PUCCH) resources, determining the one or more transmit powers for the PUCCH resources based on the indication, and reporting uplink control information (UCI) to one or more base stations using the determined one or more transmit powers.

Aspects of the present disclosure also provide various apparatuses, means, and computer program products corresponding to the methods and operations described above.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
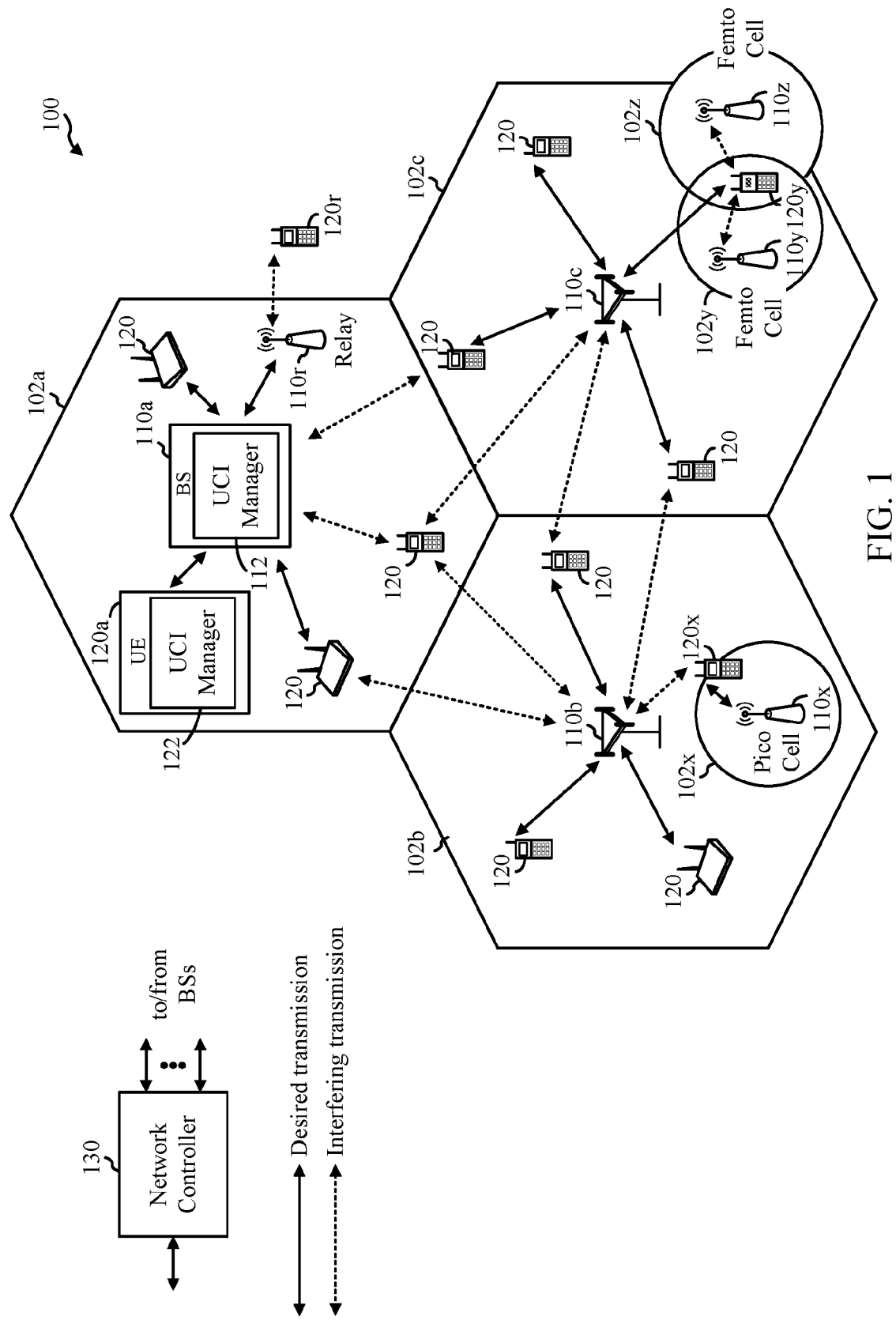
FIG. 1 is a block diagram conceptually illustrating an example telecommunications system, in accordance with certain aspects of the present disclosure.

Aspects of the present disclosure provide apparatus, methods, processing systems, and computer readable mediums for scheduling HARQ feedback, via PUCCH resources, for multi-TRP non-coherent joint transmissions and/or controlling the transmit power of the HARQ feedback scheduled on one or more PUCCH resources. In multi-TRP non-coherent joint transmission applications, a single PUCCH resource configured for HARQ feedback may delay channel state information (CSI) reporting for one of the TRPs due to a non-ideal wireless backhaul (e.g., a delay greater than 10 ms) contributing to performance losses between the UE and another one of the TRPs. The single PUCCH resource configured for HARQ feedback may be unable to support multiple PUCCH resources-based CSI feedback. Aspects of the present disclosure provide scheduling for multiple PUCCH resources with TRP-specific precoding and/or transmit power control. The UE may have multiple PUCCH resources configured for HARQ feedback allowing for simultaneous TRP-specific HARQ feedback. The simultaneous HARQ feedback transmissions using the indicated PUCCH resources may also reduce or eliminate the delay for CSI reporting. Other aspects of the present disclosure provide multi-TRP based transmit power control using one or more PUCCH resources. For instance, the UE may be configured with a PUCCH transmit power that enables multiple TRPs to detect and decode HARQ feedback messages using one or more PUCCH resources.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UNITS).

New Radio (NR) is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. The wireless communication network 100 may be a 5G New Radio (NR) network that schedules multiple PUCCH resources for multi-TRP HARQ feedback and/or controls the transmit power of the HARQ feedback scheduled on one or more PUCCH resources. As shown in FIG. 1, the BS 110a includes an uplink control information (UCI) manager 112 that provides a configuration for PUCCH resource sets to the UE 120a and provides an uplink control reporting indication indicating the PUCCH resources associated with demodulation reference signal (DMRS) port groups, in accordance with aspects of the present disclosure. The UE 120a includes an UCI manager 122 that determines the PUCCH resources associated with downlink DMRS port groups for one or more parts of UCI (e.g., HARQ feedback) also associated with the downlink DMRS port groups and reports the one or more parts of the UCI to at least one base station (e.g., BS 110a) using the determined PUCCH resources, in accordance with aspects of the present disclosure.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110*a* and a UE 120*r* in order to facilitate communication between the BS 110*a* and the UE 120*r*. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120*x*, 120*y*, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a cyclic prefix (CP) on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
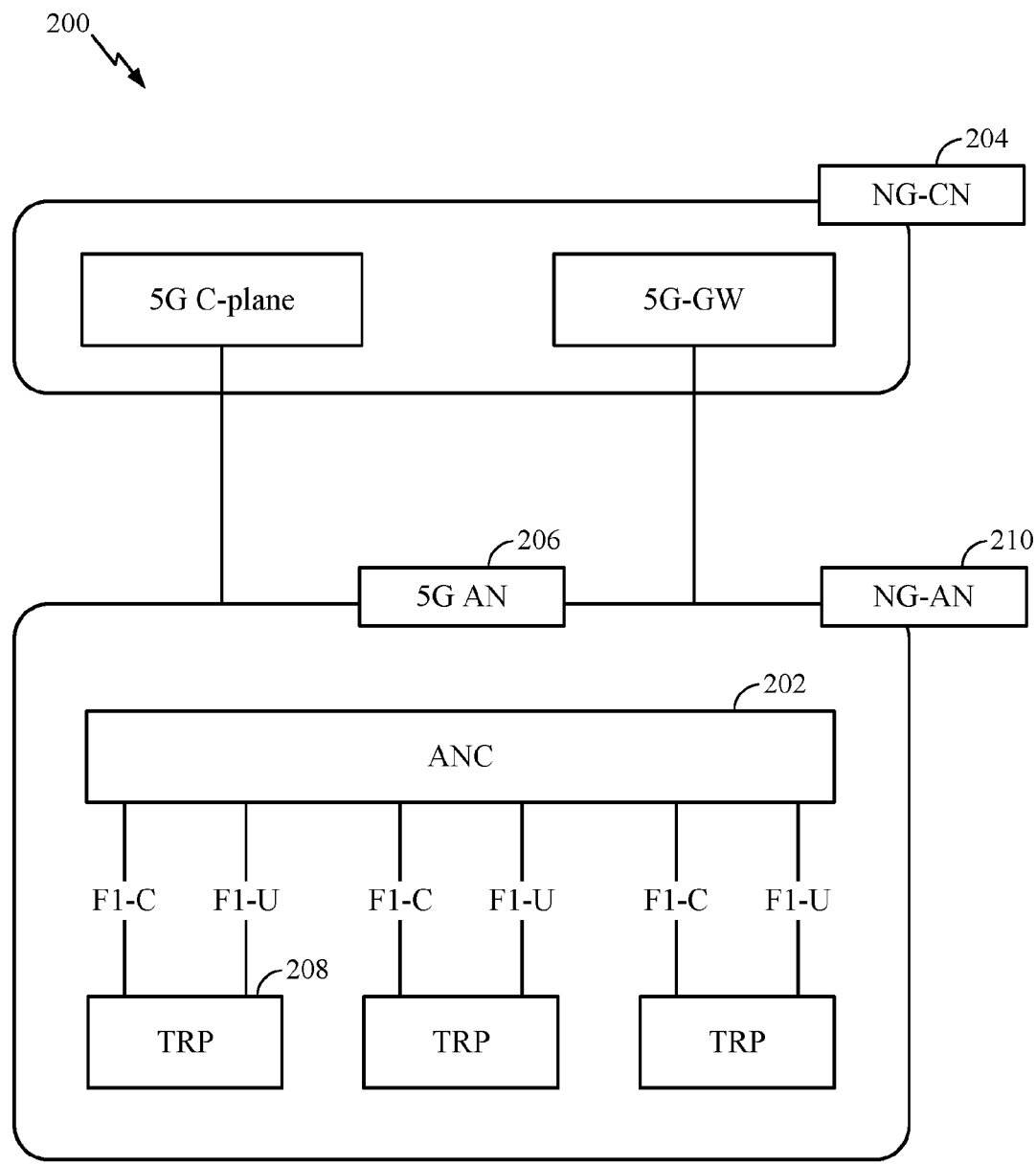
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
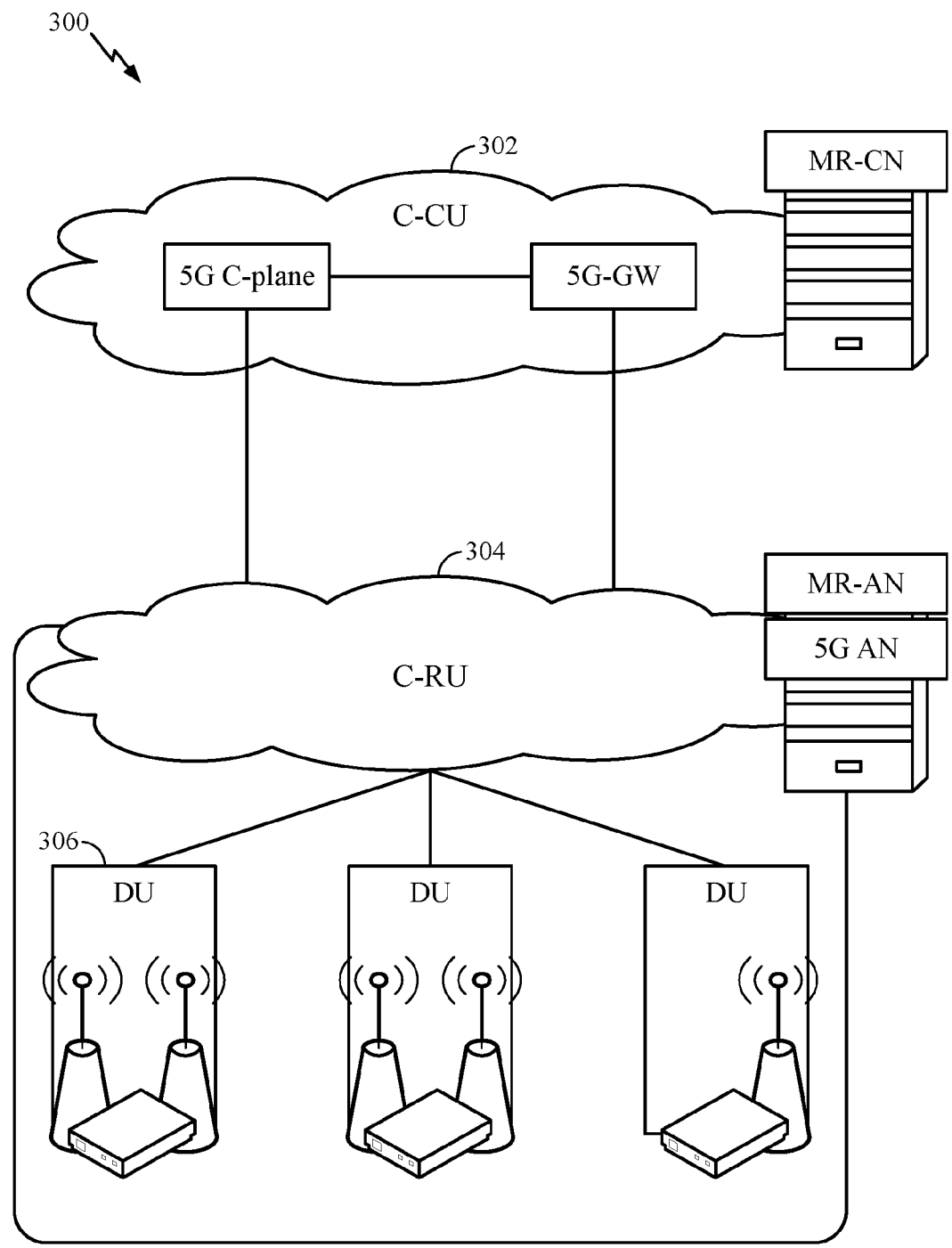
FIG. 3 is a diagram illustrating an example physical architecture of a distributed RAN, in accordance with certain aspects of the present disclosure.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
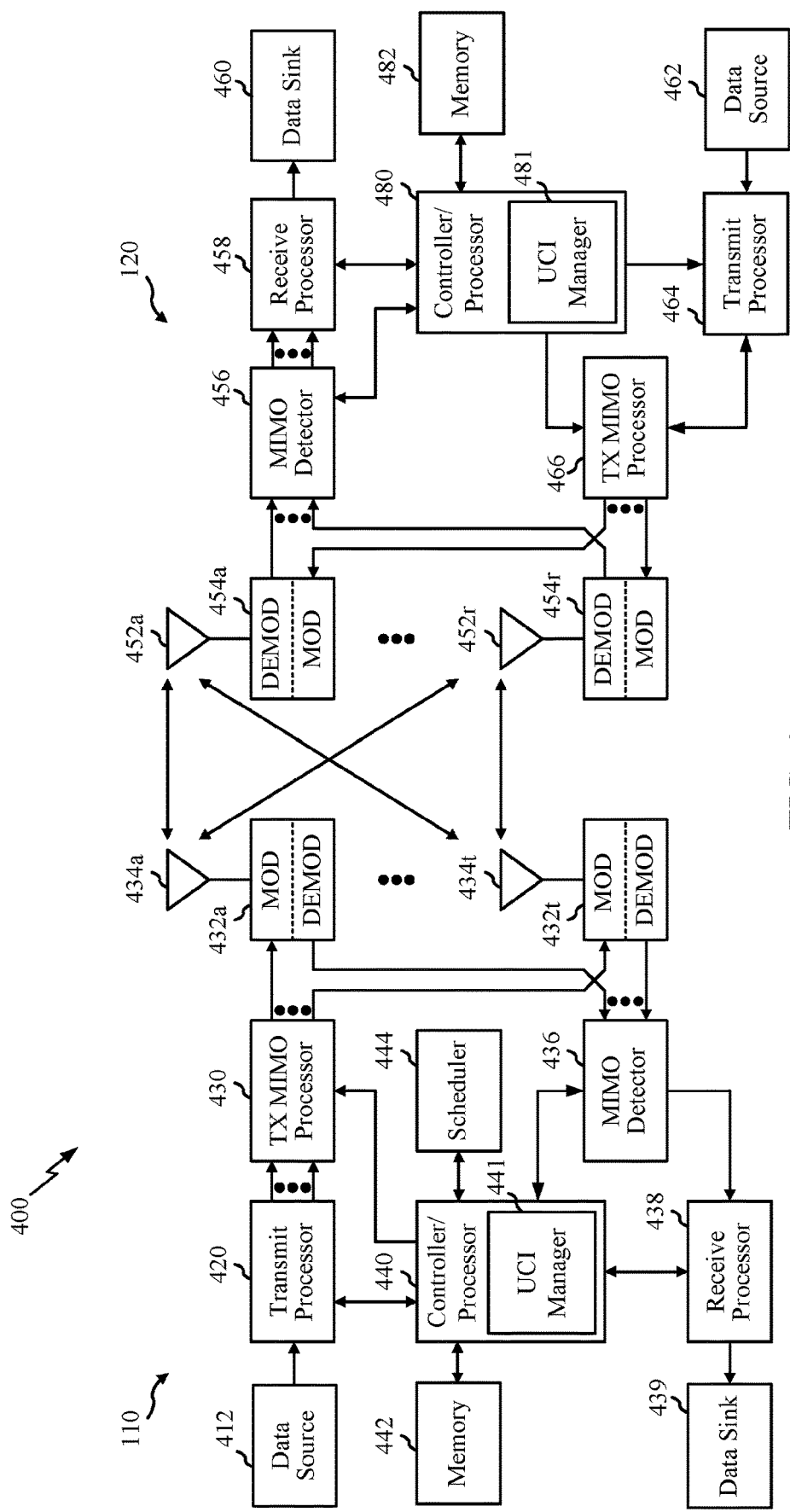
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein, such as the operations illustrated in FIGS. 7-10 or other operations described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUCCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. The controller/processor 440 of the BS 110 has an UCI manager 441 that provides a configuration for PUCCH resource sets to the UE 120 and provides an uplink control reporting indication indicating the PUCCH resources associated with DMRS port groups, according to aspects described herein. The controller/processor 480 of the UE 120 has an UCI manager 441 that determines the PUCCH resources associated with the downlink DMRS port groups for one or more parts of UCI (e.g., HARQ feedback) also associated with the downlink DMRS port groups and reports the one or more parts of the UCI to at least one base station (e.g., BS 110a) using the determined PUCCH resources, according to aspects described herein. Although shown at the Controller/Processor, other components of the UE 120 and BS 110 may be used to perform the operations described herein. A scheduler 444 may schedule UEs for data transmission on the downlink and/or uplink.

Figure 5:
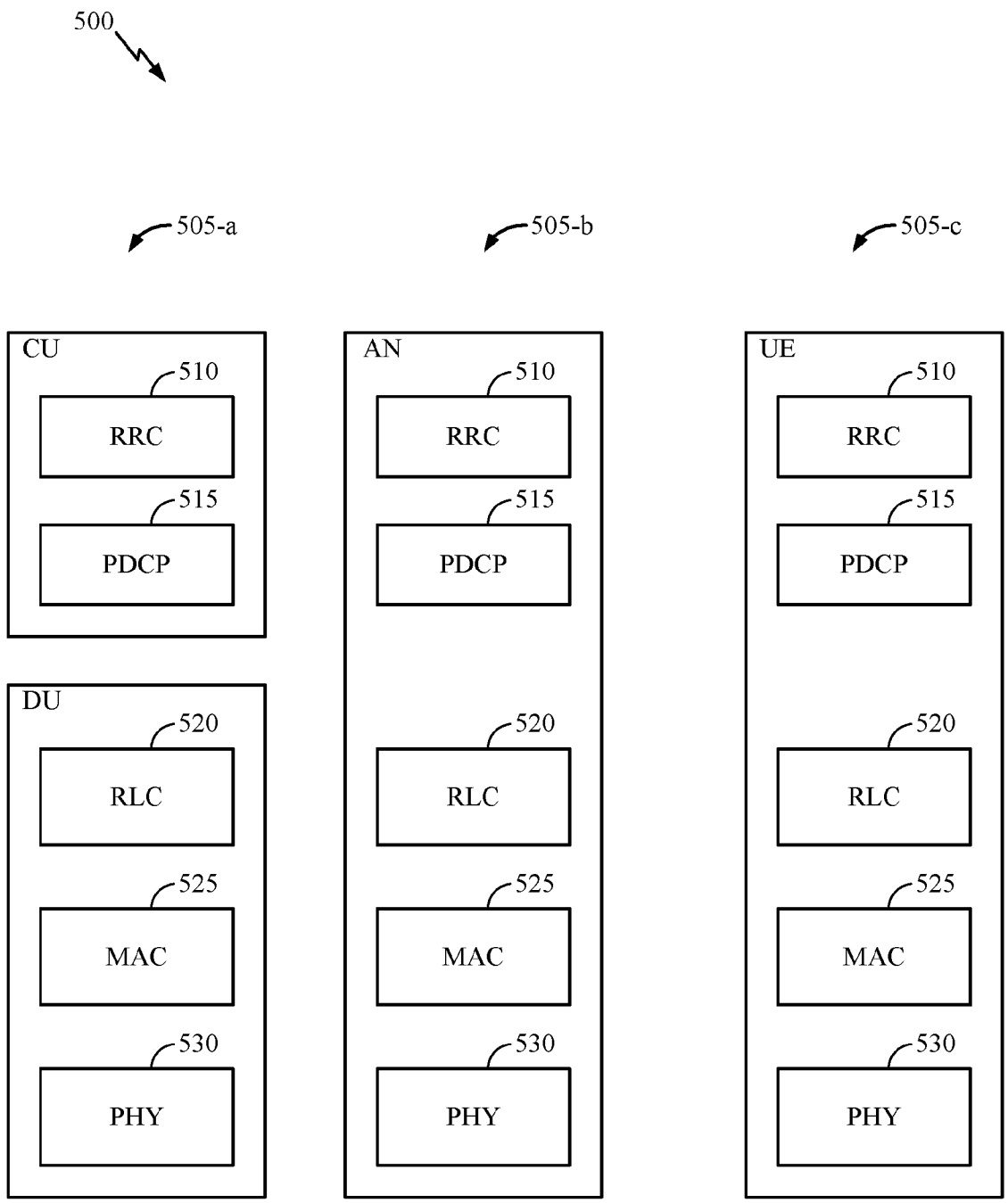
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
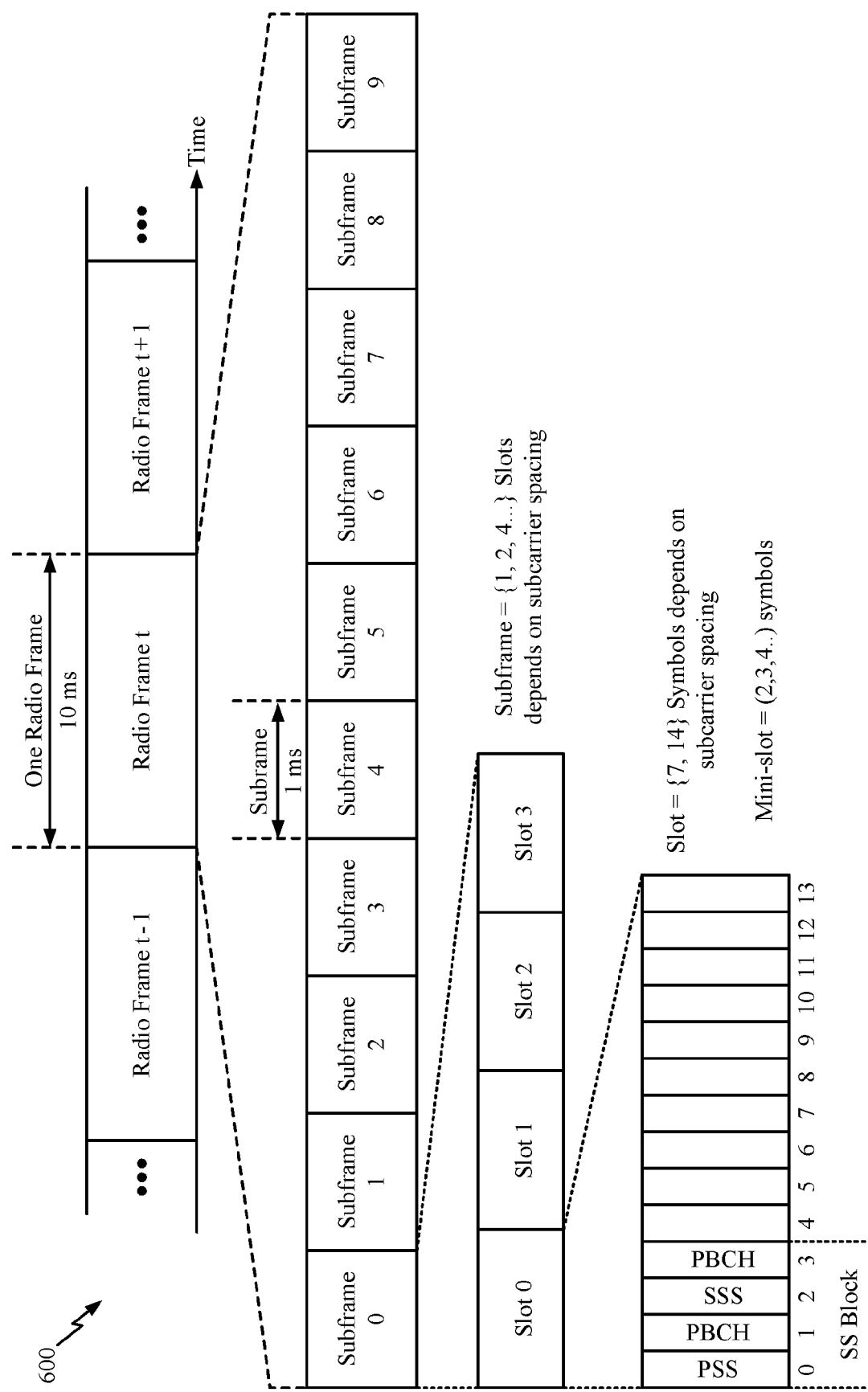
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7, 12, or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Physical Uplink Control Channel Scheduling for ACK-NACK Feedback in Multi-Transmission/Reception Point Non-Coherent Joint Transmissions In certain wireless communication networks (e.g., 5G NR wireless networks), hybrid automatic repeat request (HARQ) feedback (e.g., HARQ acknowledgement (ACK) or negative acknowledgement (NACK) messages) may be scheduled using a single PUCCH resource as indicated in the last received downlink control signaling message(s) (e.g., a DCI message). For instance, a UE may be configured via radio resource control signaling (e.g., RRC messages) with PUCCH resource sets, which may be arranged in ascending order with respect to payload size. The UE may determine the PUCCH resource set to use for certain uplink control information (UCI) based on the UCI payload size. The RAN may indicate to the UE a single PUCCH resource index, configured for HARQ feedback, via the PDSCH associated downlink control signaling (e.g., DCI messages).

In multi-TRP non-coherent joint transmission applications, the single PUCCH resource configured for HARQ feedback may delay channel state information (CSI) reporting for one of the TRPs due to a non-ideal wireless backhaul (e.g., a delay greater than 10 ms) contributing to performance losses between the UE and another one of the TRPs. The single PUCCH resource configured for HARQ feedback may be unable to support multiple PUCCH resources-based CSI feedback. Also, power control of the PUCCH resource may not take multi-TRP applications into consideration, jeopardizing the reception of the PUCCH by TRPs to which the UE is connected, especially in conditions where there is power loss imbalance between the TRPs.

Aspects of the present disclosure provide scheduling for multiple PUCCH resources with TRP-specific precoding and/or transmit power control. The UE may have multiple PUCCH resources configured for HARQ feedback allowing for simultaneous TRP-specific HARQ feedback. The simultaneous HARQ feedback transmissions using the indicated PUCCH resources may also reduce or eliminate the delay for CSI reporting. Other aspects of the present disclosure provide multi-TRP based transmit power control using one or more PUCCH resources. For instance, the UE may be configured with a PUCCH transmit power that enables multiple TRPs to detect and decode HARQ feedback messages using one or more PUCCH resources.

Figure 7:
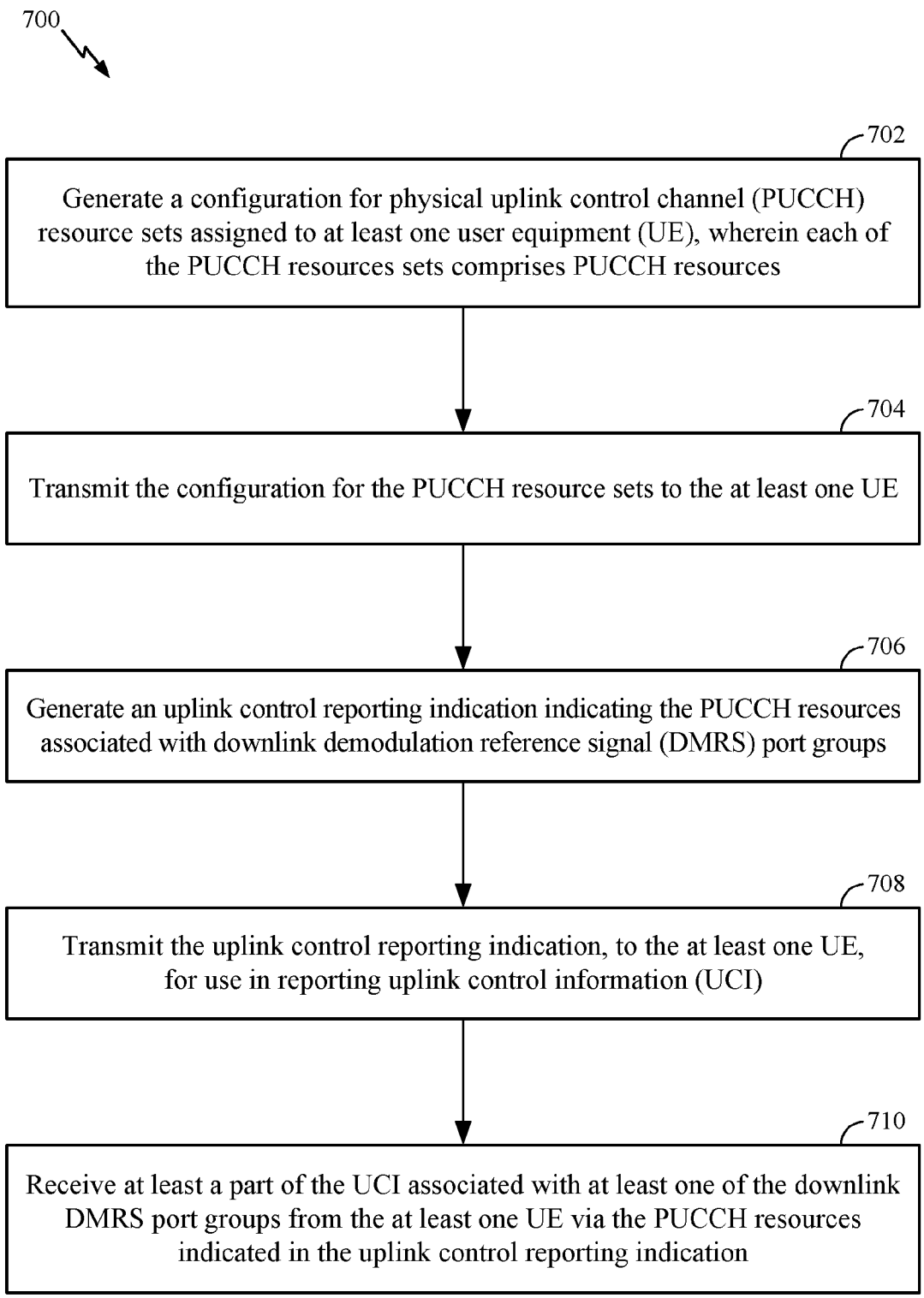
FIG. 7 is a flow diagram illustrating example operations for scheduling PUCCH resources for multi-TRP HARQ feedback, in accordance with certain aspects of the present disclosure.

FIG. 7 is a flow diagram illustrating example operations 700 that may be performed, for example, by a base station (e.g., BS 110), for scheduling PUCCH resources for multi-TRP HARQ feedback, in accordance with certain aspects of the present disclosure.

Operations 700 may begin, at 702, where the BS generates a configuration for physical uplink control channel (PUCCH) resource sets assigned to at least one user equipment (UE), wherein each of the PUCCH resources sets comprises PUCCH resources. At 704, the BS transmits the configuration for the PUCCH resource sets to the at least one UE. At 706, the BS generates an uplink control reporting indication indicating the PUCCH resources associated with downlink demodulation reference signal (DMRS) port groups. At 708, the BS transmits the uplink control reporting indication, to the at least one UE, for use in reporting uplink control information (UCI). At 710, the BS receives at least a part of the UCI associated with at least one of the downlink DMRS port groups from the at least one UE via the PUCCH resources indicated in the uplink control reporting indication.

Figure 8:
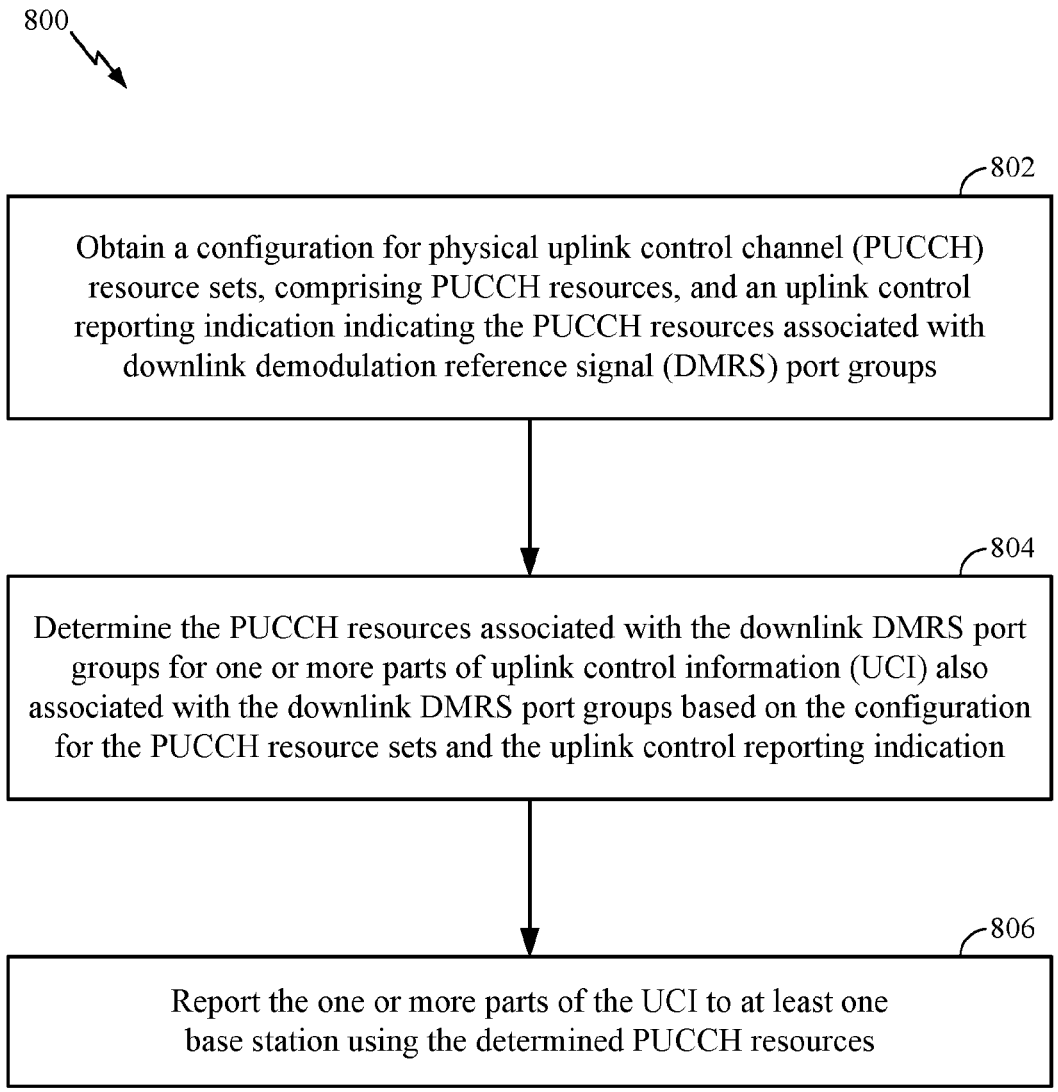
FIG. 8 is a flow diagram illustrating example operations for reporting multi-TRP HARQ feedback using multiple PUCCH resources, in accordance with certain aspects of the present disclosure.

FIG. 8 is a flow diagram illustrating example operations 800 that may be performed, for example, by a user equipment (e.g., UE 120), for reporting HARQ feedback using the scheduled PUCCH resources, in accordance with certain aspects of the present disclosure.

Operations 800 may begin, at 802, where the UE obtains a configuration for physical uplink control channel (PUCCH) resource sets, comprising PUCCH resources, and an uplink control reporting indication indicating the PUCCH resources associated with downlink demodulation reference signal (DMRS) port groups. At 804, the UE determines the PUCCH resources associated with the downlink DMRS port groups for one or more parts of uplink control information (UCI) also associated with the downlink DMRS port groups based on the configuration for the PUCCH resource sets and the uplink control reporting indication. At 806, the UE reports the one or more parts of the UCI to at least one base station using the determined PUCCH resources.

As used herein, a PUCCH resource associated with one or more downlink demodulation reference signal (DMRS) port groups refers to a PUCCH resource being configured for UCI transmissions (e.g., HARQ feedback) targeting multiple TRPs. For example, a UE may receive downlink DMRSs from multiple TRPs using DMRS port groups (e.g., multiple antenna port groups). Each of the DMRS port groups may be assigned to a different TRP and used for non-coherent joint transmissions. The UE may report UCI (e.g., HARQ feedback) to multiple TRPs, simultaneously, associated with the different DMRS port groups using the one or more PUCCH resources.

In certain aspects, the UE may be configured with n (where n equals the number of TRPs) sets of PUCCH resources via radio resource control signaling (e.g., RRC messages). Each resource set may be associated with a certain TRP. For instance, the PUCCH resource sets may include the PUCCH resources associated with at least one of the DMRS port groups, and each of the PUCCH resource sets may include PUCCH resource subsets associated with different UCI payload sizes.

The nth set of PUCCH resources contains $M_n$ subsets of PUCCH resources. Each subset of PUCCH resources may have the same maximum allowed UCI payload size per resource. For the nth set of PUCCH resources, it may be assumed that $P_1^n \leq P_2^n \leq \ldots \leq P_{M_n}^n$, where $P_m^n$ ($1 \leq m \leq M_n$) is the maximum allowed UCI payload size for the mth subset within the nth set of PUCCH resources. The UE may divide the UCI payload into TRP-specific parts. If different TRPs send different codewords (CWs), each TRP-specific part of the UCI may include TRP-specific HARQ feedback bits. For example, the UCI may include the following TRP-parts:

UCI Part1: {$TRP_1$ UCI}; UCI Part-2: {$TRP_2$ UCI}; ... UCI Part-N: {$TRP_N$ UCI}

The UE may determine a PUCCH resource subset index $m_n$ from the $M_n$ subsets of PUCCH resources based on the payload size of the UCI ($S_n$), such that $P_{m_n-1}^n < S_n \leq P_{m_n}^n$. Each part of the UCI may use a different PUCCH resource set.

The PUCCH resources configured for multi-TRP HARQ feedback may be scheduled using downlink control signaling, such as DCI messages. For instance, one or more TRP-specific indicators DCI_Index$_n$, which schedule the PUCCH resources configured for multi-TRP HARQ feedback, may be provided in the downlink control signaling. The TRP-specific indicator(s) DCI_Index$_n$, may indicate the PUCCH resources associated with the n parts of the UCI. The UE may determine, based on the indicator DCI_Index$_n$ signaled directly or indirectly (implicitly), a PUCCH resource index within the $m_n$th PUCCH resource subset of the nth PUCCH resource set corresponding to the nth part of the UCI. As an example, the uplink control reporting indication may include a plurality of PUCCH resource indexes that indicate each of the PUCCH resources within the PUCCH resource subsets used to transmit each part of the UCI. The indicator(s) may be signaled using one or more DCI messages. In cases where multiple DCI messages are used, each DCI message may be associated with a certain TRP, and each indicator may be associated with a certain part of the UCI.

For certain aspects, a common indicator may be used to schedule the PUCCH resources, for example, via downlink control signaling. For instance, a TRP-common indicator DCI_Index may indicate to the UE to use a default schedule for the PUCCH resources configured for multi-TRP HARQ feedback, the same PUCCH resource, and/or PUCCH resource hopping (e.g., randomized PUCCH resource hopping) using a fixed or flexible time offset. The UE may determine, based on the common indicator signaled directly or indirectly (implicitly), a PUCCH resource index within the $m_n$th PUCCH resource subset of the nth PUCCH resource set corresponding to the nth part of the UCI. The common indicator may be signaled using one or more DCI messages.

As an example, suppose the UE is RRC configured with two PUCCH resource sets, and each of the PUCCH resource sets may have four PUCCH resource subsets. The maximum allowed payload sizes of the four PUCCH resource subsets are 2, 4, 8, 11 bits, respectively. Each of the PUCCH resource sets has the same maximum allowed payload sizes for their subsets. The UE has UCI part-1 with 11 bits, and UCI part-2 with 6 bits. Therefore, the fourth subset in the first set is selected for UCI part-1, and the third subset in the second set is selected for UCI part-2. Using a TRP-specific indication with two DCI messages, the TRP-specific indication in the first DCI has 3-bits indicated as "001", and the TRP-specific indication in the second DCI has 3-bits indicated as "101". Therefore, the UE determines that the PUCCH resource with index-ID="001" within the PUCCH resource subset selected by UCI part-1 is used for UCI part-1, and the PUCCH resource with index-ID="101" within the PUCCH resource subset selected by UCI part-2 is used to transmit UCI part-2.

Suppose under the same example using a TRP-common indication with a single DCI message, the TRP-common indication in the DCI has 3-bits indicated as "011". Therefore, the UE determines that the PUCCH resource with index-ID="011" within the PUCCH resource subset selected by UCI part-1 is used for UCI part-1, and the PUCCH resource also with index-ID="011" within the PUCCH resource subset selected by UCI part-2 is used to transmit UCI part-2.

For certain aspects, multiple PUCCH resource sets may be configured via radio resource control signaling from the BS to the UE. Each PUCCH resource set is associated with a TRP (or a downlink DMRS port group implicitly indicating a certain TRP). Within each PUCCH resource set, there are multiple PUCCH resource subsets, which have different UCI payload sizes. Within each PUCCH resource subset, there are multiple PUCCH resources, and each PUCCH resource has a different time-frequency resource allocation. For each TRP (or DMRS port group), the UE determines the PUCCH resource set associated with the TRP and the PUCCH resource subset within the PUCCH resource set according to the UCI payload size for the TRP. The BS sends an index for each TRP. The indexes indicate to the UE which specific PUCCH resource within the PUCCH resource subset of the PUCCH resource set to use for transmitting a corresponding part of UCI. In general, the BS indicates to the UE which PUCCH resource(s) to use for multi-TRP HARQ feedback, and the UE determines which PUCCH resource sets/subsets to use for the HARQ feedback. The RAN may also be aware of the PUCCH sets/subsets selected by the UE based on the UCI payload size.

In certain aspects, the UE may be configured with M sets of PUCCH resources without any PUCCH resource subsets as described herein. It may be assumed that $P_1 \leq P_2 \leq \ldots \leq P_M$, where $P_m$ ($1 \leq m \leq M$) is the maximum allowed UCI payload size for the m set of PUCCH resources. Each of the PUCCH resource sets may be associated with different UCI payload sizes. The UE may divide the UCI payloads into TRP-specific parts as described herein. For the nth part of UCI with payload size $S_n$, the UE may determine the PUCCH resource set index $m_n$ such that $P_{m_n-1} < S_n \leq P_{m_n}$. A TRP-specific indicator or a TRP-common indicator via downlink control signaling may be used to schedule the PUCCH resources within the PUCCH resource set corresponding to the n parts of the UCI. Different parts of the UCI may use the same PUCCH resource set. As an example, the uplink control reporting indication may include a plurality of PUCCH resource indexes that indicate each of the PUCCH resources used to transmit each part of the UCI.

As an example, suppose the UE is RRC configured with four PUCCH resource sets, and the maximum allowed payload sizes of the four PUCCH resource sets are 2, 4, 8, 11 bits, respectively. The UE has UCI part-1 with 11 bits and UCI part-2 with 6 bits. Therefore, the fourth PUCCH resource set is selected for UCI part-1, and the third PUCCH resource set is selected for UCI part-2. Using a TRP-specific indication with two DCI messages, the TRP-specific indication in the first DCI message has 3-bits indicated as "001", and the TRP-specific indication in the second DCI has 3-bits indicated as "101". Therefore, the UE determines that the PUCCH resource with index-ID="001" within the PUCCH resource set selected by UCI part-1 is used for UCI part-1, and the PUCCH resource with index-ID="101" within the PUCCH resource set selected by UCI part-2 is used to transmit UCI part-2.

Suppose under the same example using a TRP-common indication with a single DCI message, the TRP-common indication in the DCI has 3-bits indicated as "011" Therefore, the UE determines the PUCCH resource with index-ID="011" within the PUCCH resource set selected by UCI part-1 is used to transmit UCI part-1, and the PUCCH resource also with index-ID="011" within the PUCCH resource set selected by UCI part-2 is used to transmit UCI part-2

As another example, suppose the UE is RRC configured with four PUCCH resource sets, and the maximum allowed payload sizes of the four PUCCH resource sets are 2, 4, 8, 11 bits, respectively. The UE has UCI part-1 with 8 bits and UCI part-2 with 6 bits. Therefore, the third PUCCH resource set is selected for both UCI part-1 and UCI part-2. Using a TRP-specific indication with two DCI messages, the TRP-specific indication in the first DCI has 3-bits indicated as "001", and the TRP-specific indication in the second DCI has 3-bits indicated as "101". Therefore, the UE determines that the PUCCH resource with index-ID="001" within the PUCCH resource set selected by UCI part-1 is used to transmit UCI part-1, and the PUCCH resource with index-ID="101" within the PUCCH resource set selected by UCI part-2 is used to transmit UCI part-2.

Suppose under the same example using a TRP-common indication with a single DCI message, the TRP-common indication in the DCI has 3-bits indicated as "011". Therefore, the UE determines that the PUCCH resource with index-1D="011" within the PUCCH resource set selected by UCI part-1 is used to transmit UCI part-1, and the PUCCH resource with index-ID="101" within the PUCCH resource set selected by UCI part-2 is used to transmit UCI part-2. Here, the index-ID="011" for UCI part-2 is determined based on a randomized function, as further described herein, depending on the indicated bits "011", the RNTI, and the resource set index.

For certain aspects, the TRP-specific indicator may correspond directly or indirectly (implicitly) to each part of the UCI. In some aspects, each part of the UCI may use the same index value as the PUCCH resource index indicated by the TRP-specific indicator associated with each PUCCH resource set/subset. In other aspects, each part of the UCI may correspond to the PUCCH resource index as provided by the TRP-specific indicator according to one or more parameters including but not limited to an UCI part index, an PUCCH resource set index, an PUCCH resource subset index, and/or a radio network temporary identifier (RNTI). For instance, each part of the UCI may correspond to the PUCCH resource according to a certain randomized function of the TRP-specific indicator depending on an UCI part index, PUCCH resource set/subset index, and/or the RNTI, where the output of the randomized function is an PUCCH resource index associated with a certain part of the UCI.

As an example, the uplink control reporting indication may include at least one first index associated with one of the PUCCH resource sets corresponding to at least one second index for each part of the UCI. In some aspects, the at least one first index associated with one of the PUCCH resource sets may directly correspond to the at least one second index for each part of the UCI. In other aspects, the at least one first index associated with one of the PUCCH resource sets may implicitly correspond to the at least one second index for each part of the UCI according to at least one of an UCI index, an PUCCH resource set index, an PUCCH resource subset index, and/or a radio network temporary identifier (RNTI).

In some aspects, the UE may report one or more parts of the UCI associated with TRPs using one of the PUCCH resources within a PUCCH resource subset based on an UCI part index determined from PUCCH resource index and a payload size of one of the parts of the UCI. For example, the UE may determine the UCI part associated with a certain TRP based on a payload size of the HARQ feedback for the TRP and the PUCCH resource index indicated via downlink control signaling as described herein. In other aspects, the UE may report one or more parts of the UCI associated with TRPs using a PUCCH resource associated with one of the TRPs within one of the PUCCH sets based on UCI part index determined from the PUCCH resource index and a payload size of the UCI. For example, the UE may determine the UCI part associated with a certain TRP based on a payload size of the HARQ feedback and the PUCCH resource index indicated via downlink control signaling as described herein.

In certain aspects, the uplink control reporting indication may indicate time-domain offsets associated with the PUCCH resources configured for reporting the UCI (e.g., the HARQ feedback). For instance, suppose there is only one PUCCH resource index sent to the UE, and there are two PUCCH resources scheduled for multi-TRP HARQ feedback with the same associated UCI payload sizes using PUCCH resource sets without any PUCCH resource subsets. The PUCCH resources scheduled for HARQ feedback may have time-domain offsets regarding the starting symbol of the PUCCH resources such as offsets of one or more OFDM symbols or one or more slots. As an example, the UE may determine, based on the single PUCCH resource index sent, that the first PUCCH resource uses the first two symbols, and the UE may assume that the other PUCCH resource uses the next two symbols.

In certain aspects, the RAN may determine a transmit power for the one or more PUCCH resources configured for HARQ feedback and signal the transmit power to the UE, which may use the transmit power in reporting the HARQ feedback.

Figure 9:
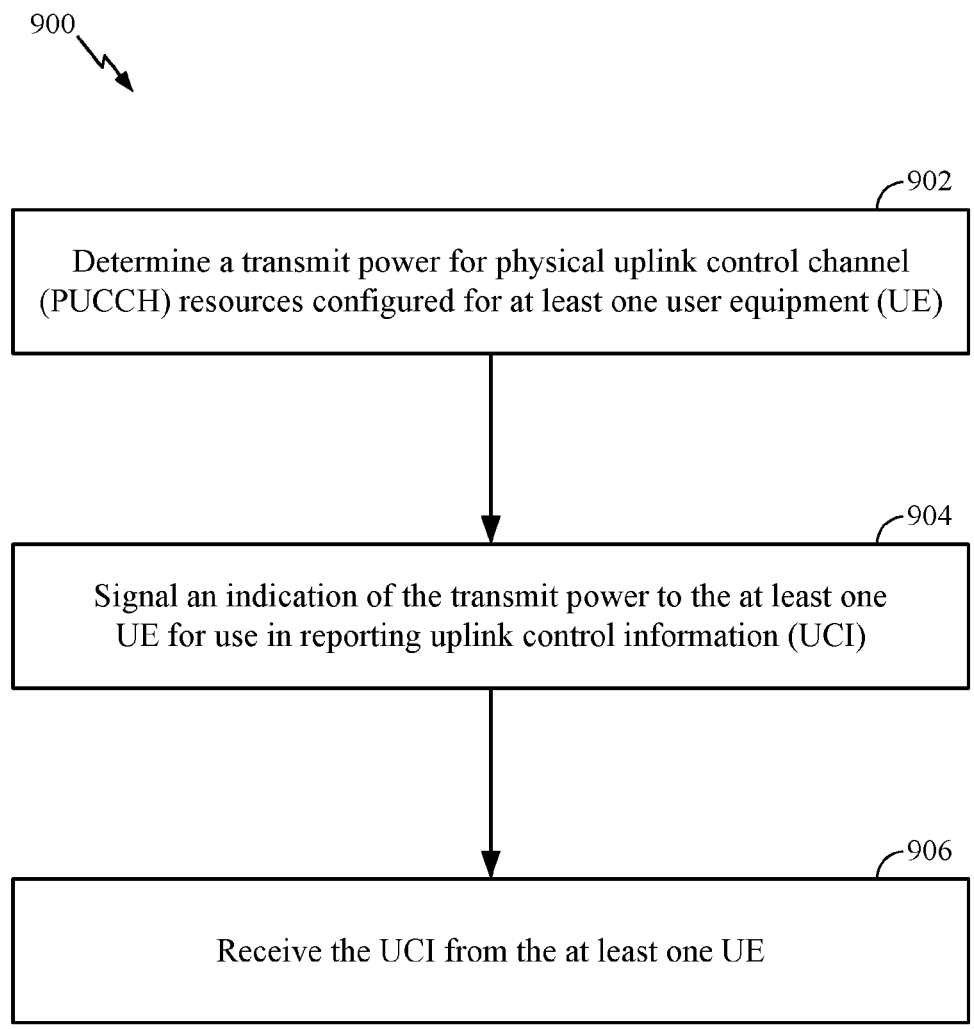
FIG. 9 is a flow diagram illustrating example operations for determining and signaling one or more transmit powers for PUCCH resources configured for HARQ feedback, in accordance with certain aspects of the present disclosure.

FIG. 9 is a flow diagram illustrating example operations 900 that may be performed, for example, by a RAN entity such as a base station (e.g., BS 110), access node controller (e.g., ANC 202), and/or a core network (e.g., NG-CN 204), for determining and signaling one or more transmit powers for PUCCH resources configured for HARQ feedback, in accordance with certain aspects of the present disclosure.

Operations 900 may begin, at 902, where the BS determines a transmit power for physical uplink control channel (PUCCH) resources configured for at least one user equipment (UE). At 904, the BS signals an indication of the transmit power to the at least one UE for use in reporting uplink control information (UCI). At 906, the BS receives the UCI from the at least one UE.

Figure 10:
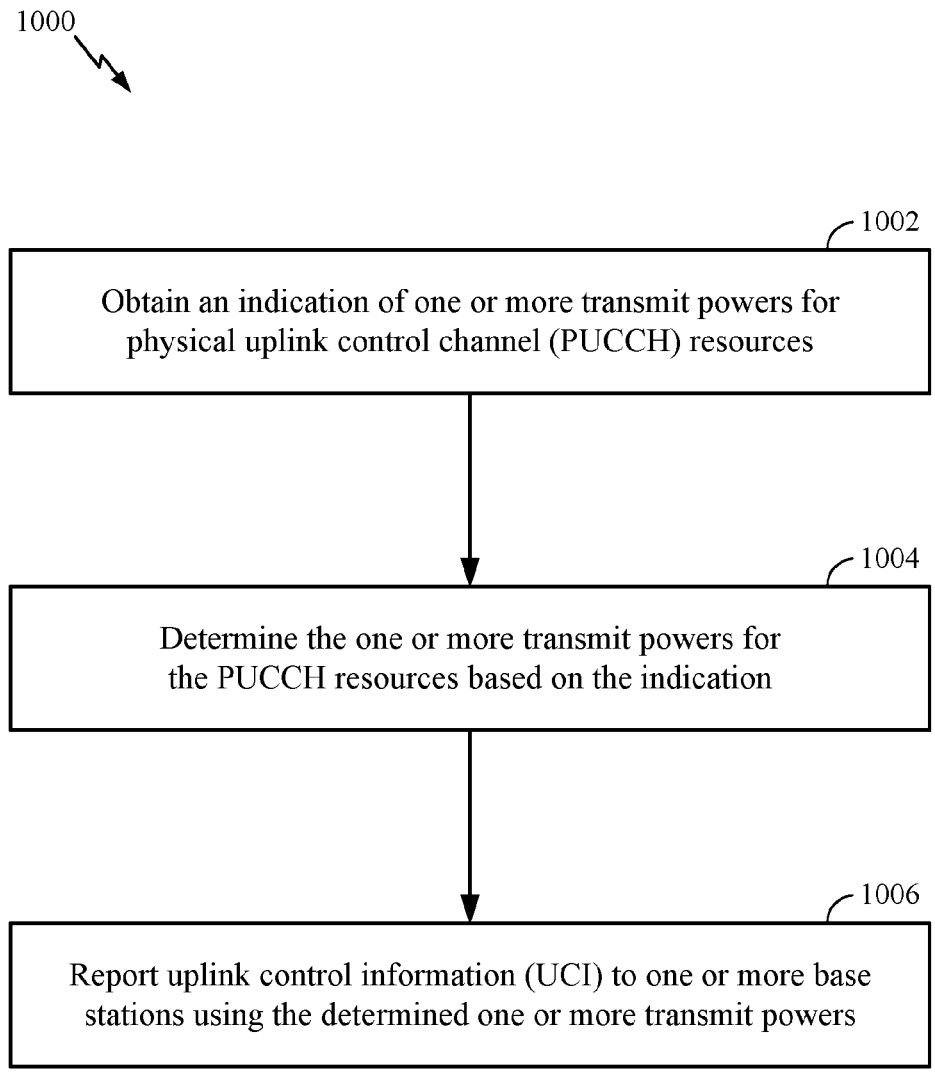
FIG. 10 is a flow diagram illustrating example operations for receiving and using one or more transmit powers for PUCCH resources configured for HARQ feedback, in accordance with certain aspects of the present disclosure.

FIG. 10 is a flow diagram illustrating example operations 1000 that may be performed, for example, by a user equipment (e.g., UE 120), for receiving and using one or more transmit powers for PUCCH resources configured for HARQ feedback, in accordance with certain aspects of the present disclosure.

Operations 1000 may begin, at 1002, where the UE obtains an indication of one or more transmit powers for physical uplink control channel (PUCCH) resources. At 1004, the UE determines the one or more transmit powers for the PUCCH resources based on the indication. At 1006, the UE reports uplink control information (UCI) to one or more base stations using the determined one or more transmit powers.

In certain aspects, the RAN entity may determine the transmit power based on reception powers of reference signals (e.g., sounding reference signals) associated with different TRPs (e.g., different downlink DMRS port groups) received from the UE. The transmit power may be determined based on the weakest reception power of the reference signals associated with different TRPs. For instance, the transmit power may be estimated to allow the HARQ feedback from the UE to be received by the TRP with the weakest received power for a sounding reference signal (SRS).

As an example, suppose the UE is scheduled to use a single PUCCH resource for HARQ feedback and is connected to two TRPs. The UE transmits all HARQ feedback using the same PUCCH resource. The RAN determines that the SRS reception power measured at the first TRP is worse than the SRS reception power measured at the second TRP. The RAN determines that PUCCH transmit power according to the SRS reception power measured at the first TRP.

For certain aspects, for each TRP-specific PUCCH resource, the RAN entity may determine and indicate to the UE a TRP-specific precoder and/or a TRP-specific transmit power for the PUCCH resources configured for HARQ feedback. The indication may be transmitted to the UE via radio resource control signaling and/or downlink control signaling.

In certain aspects, the RAN entity may select, based on reception power of reference signals (e.g., sound reference signals from different TRPs) received from the UE, whether to (1) generate the uplink control reporting indication and determine transmit powers for the PUCCH resources configured for multi-TRP HARQ feedback or (2) to determine the transmit power for PUCCH resources configured for multi-TRP HARQ feedback. For instance, the selection may be based on a difference between the reception powers associated with different TRPs being less than or equal to a threshold value (e.g., 5 dB).

As an example, the RAN entity may select, based on a difference between the reception powers being greater than or equal to the threshold value, to generate the uplink control reporting indication and determine transmit powers for the PUCCH resources associated with downlink DMRS port groups (e.g., multi-TRP PUCCH resources) as described herein. As another example, the RAN entity may select, based on a difference between the reception powers being less than or equal to the threshold value, to determine the transmit power(s) for PUCCH resources as described herein.

Scheduling PUCCH resources for multi-TRP HARQ feedback has the benefit of improved power control, whereas controlling the transmit power of PUCCH resources enjoys coding gain. If the multiple TRPs are more or less comparable in the uplink environment, then controlling the transmit power for PUCCH resources is preferable since the power loss (or additional power) is not expected to be large. Otherwise, Scheduling PUCCH resources for multi-TRP HARQ feedback may be suitable for TRPs with uplink power differences greater than or equal to a threshold (e.g., if the uplink power difference is 5 dB or higher). In general, the RAN entity may compare the SRS reception powers associated with multiple TRPs, determine whether there is a power imbalance between the SRS receptions with the TRPs, and select whether to schedule TRP-specific PUCCH resources and/or configure one or more TRP-specific transmit powers for the PUCCH resources.

Figure 11:
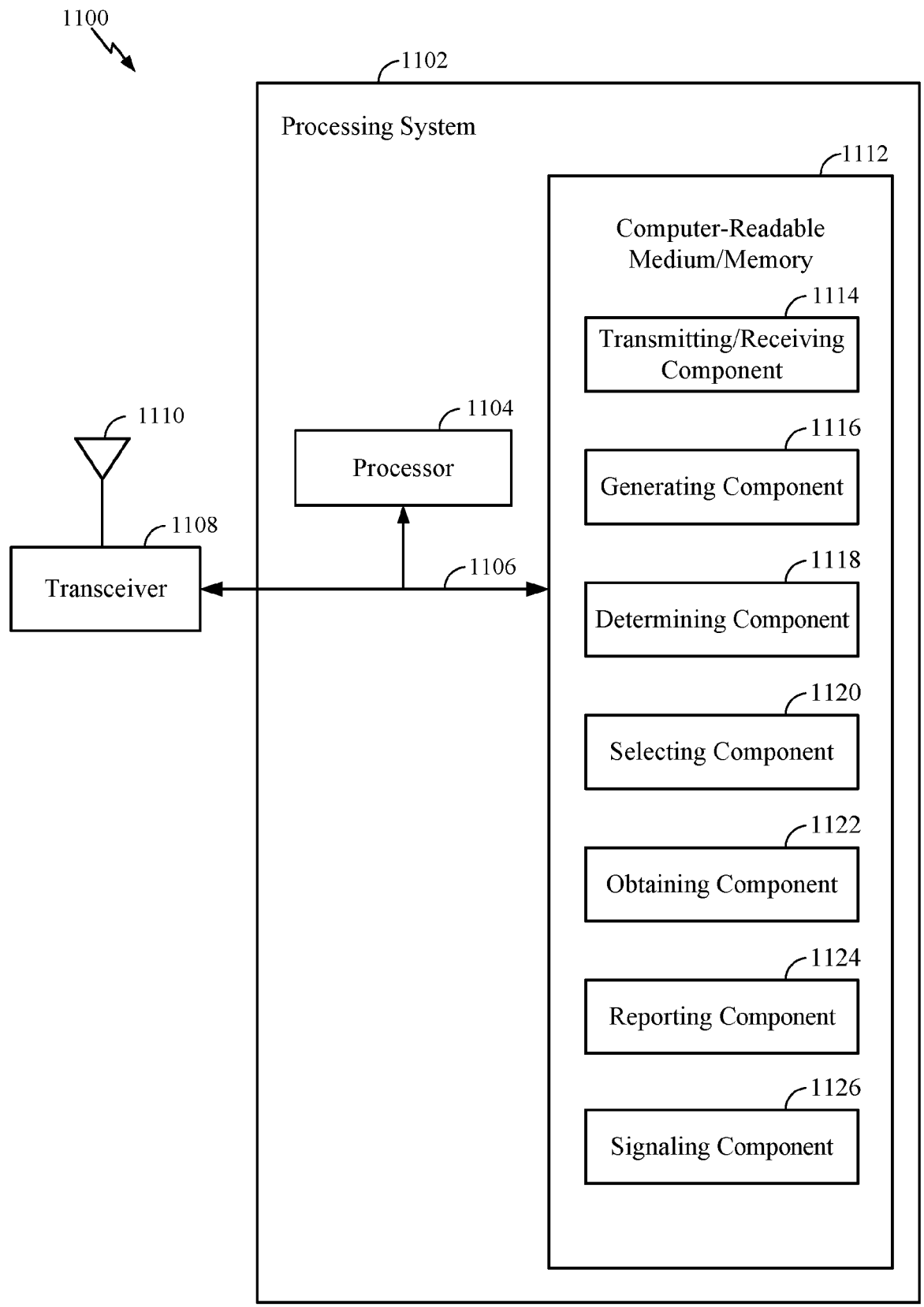
FIG. 11 illustrates a communications device that may include various components configured to perform operations for the techniques disclosed herein in accordance with aspects of the present disclosure.

FIG. 11 illustrates a communications device 1100 (e.g., a BS 110 or UE 120) that may include various components (e.g., corresponding to means-plus-function components) configured to perform operations for the techniques disclosed herein, such as the operations illustrated in FIGS. 7-10. The communications device 1100 includes a processing system 1102 coupled to a transceiver 1108 (e.g., a transmitter and/or receiver). The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIGS. 7-10, or other operations for performing the various techniques discussed herein.

In certain aspects, the processing system 1102 may further include a transmitting/receiving component 1114 for performing the operations illustrated in FIGS. 7-10, or other aspects of the operations discussed herein. Additionally, the processing system 1102 may include a generating component 1116 for performing the operations illustrated in FIGS. 7-10, or other aspects of the operations discussed herein. Additionally, the processing system 1102 may include determining component 1118 for performing the operations illustrated in FIGS. 7-10, or other aspects of the operations discussed herein. Additionally, the processing system 1102 may include a selecting component 1120 for performing the operations illustrated in FIGS. 7-10, or other aspects of the operations discussed herein. Additionally, the processing system 1102 may include an obtaining component 1122 for performing the operations illustrated in FIGS. 7-10, or other aspects of the operations discussed herein. Additionally, the processing system 1102 may include a reporting component 1124 for performing the operations illustrated in FIGS. 7-10, or other aspects of the operations discussed herein. Additionally, the processing system 1102 may include a signaling component 1126 for performing the operations illustrated in FIGS. 7-10, or other aspects of the operations discussed herein.

The transmitting/receiving component 1114, generating component 1116, determining component 1118, selecting component 1120, obtaining component 1122, reporting component 1124, and/or signaling component 1126 may be coupled to the processor 1104 via bus 1106. In certain aspects, the transmitting/receiving component 1114, generating component 1116, determining component 1118, selecting component 1120, obtaining component 1122, reporting component 1124, and/or signaling component 1126 may be hardware circuits. In certain aspects, the transmitting/receiving component 1114, generating component 1116, determining component 1118, selecting component 1120, obtaining component 1122, reporting component 1124, and/or signaling component 1126 may be software components that are executed and run on processor 1104.

In addition to the examples described above, many examples of specific combinations are within the scope of the disclosure, some of which are detailed below:

Example 1: A method of wireless communication by a user equipment (UE), comprising: obtaining a configuration for physical uplink control channel (PUCCH) resource sets, comprising PUCCH resources, and an uplink control reporting indication indicating the PUCCH resources associated with downlink demodulation reference signal (DMRS) port groups; determining the PUCCH resources associated with the downlink DMRS port groups for one or more parts of uplink control information (UCI) also associated with the downlink DMRS port groups based on the configuration for the PUCCH resource sets and the uplink control reporting indication; and reporting the one or more parts of the UCI to at least one base station using the determined PUCCH resources.

Example 2: The method of example 1, wherein the uplink control reporting indication includes at least one first index associated with one of the PUCCH resource sets corresponding to at least one second index for each part of the UCI.

Example 3: The method of example 2, wherein the at least one first index associated with one of the PUCCH resource sets directly corresponds to the at least one second index for each part of the UCI.

Example 4: The method of example 2, wherein the at least one first index associated with one of the PUCCH resource sets corresponds to the at least one second index for each part of the UCI according to at least one of an UCI index, an PUCCH resource set index, an PUCCH resource subset index, or a radio network temporary identifier (RNTI).

Example 5: The method of example 2, wherein: the PUCCH resource sets include the PUCCH resources associated with at least one of the downlink DMRS port groups, and each of the PUCCH resource sets includes PUCCH resource subsets associated with different UCI payload sizes.

Example 6: The method of example 5, wherein reporting the one or more parts of the UCI comprises reporting the one or more parts of the UCI associated with the at least one of the downlink DMRS port groups using one of the PUCCH resources associated with the at least one of the downlink DMRS port groups within a PUCCH resource subset based on the at least one second index determined from the at least one first index and a payload size of the one or more parts of the UCI.

Example 7: The method of example 6, wherein the at least one first index includes a plurality of PUCCH resource indexes that indicate each of the PUCCH resources within the PUCCH resource subsets used to transmit each part of the UCI.

Example 8: The method of example 2, wherein the PUCCH resource sets include PUCCH resources associated with different UCI payload sizes.

Example 9: The method of example 8, wherein reporting the one or more parts of the UCI comprises reporting the one or more parts of the UCI associated with the at least one of the downlink DMRS port groups using at least one of the PUCCH resources associated with the at least one of downlink DMRS port groups within one of the PUCCH sets based on the at least one second index determined from the at least one first index and a payload size of the UCI.

Example 10: The method of example 9, wherein the at least one first index includes a plurality of PUCCH resource indexes that indicate each of the PUCCH resources within the PUCCH resource sets used to report each part of the UCI.

Example 11: The method of example 1, wherein obtaining the uplink control reporting indication comprises receiving one or more downlink control messages comprising one or more parts of the uplink control reporting indication.

Example 12: The method of example 1, wherein obtaining the configuration for the PUCCH resource sets and the uplink control reporting indication comprises: receiving the configuration for the PUCCH resource sets via radio resource control signaling; and receiving the uplink control reporting indication via downlink control signaling.

Example 13: The method of example 1, wherein the downlink DMRS port groups are used for non-coherent joint transmissions.

Example 14: The method of example 1, wherein: the uplink control reporting indication includes time-domain offsets associated with PUCCH resources to use for reporting the UCI; and reporting the one or more parts of the UCI comprises reporting the one or more parts of the UCI using the time-domain offsets associated with the PUCCH resources.

Example 15: A method of wireless communication by a base station (BS), comprising generating a configuration for physical uplink control channel (PUCCH) resource sets assigned to at least one user equipment (UE), wherein each of the PUCCH resources sets comprises PUCCH resources; transmitting the configuration for the PUCCH resource sets to the at least one UE; generating an uplink control reporting indication indicating the PUCCH resources associated with downlink demodulation reference signal (DMRS) port groups; transmitting the uplink control reporting indication, to the at least one UE, for use in reporting uplink control information (UCI); and receiving at least a part of the UCI associated with at least one of the downlink DMRS port groups from the at least one UE via the PUCCH resources indicated in the uplink control reporting indication.

Example 16: The method of example 15, wherein: transmitting the configuration for the PUCCH resource sets comprises transmitting the configuration for the PUCCH resource sets via radio resource control signaling to the at least one UE, the PUCCH resource sets include the PUCCH resources associated with at least one of the DMRS port groups, and each of the PUCCH resource sets includes PUCCH resource subsets associated with different UCI payload sizes.

Example 17: The method of example 16, wherein the uplink control reporting indication includes a plurality of PUCCH resource indexes that indicate each of the PUCCH resources within the PUCCH resource subsets used to transmit each part of the UCI.

Example 18: The method of example 15, wherein each of the PUCCH resource sets are associated with different UCI payload sizes.

Example 19: The method of example 18, wherein the uplink control reporting indication includes a plurality of PUCCH resource indexes that indicate each of the PUCCH resources used to transmit each part of the UCI.

Example 20: The method of example 15, wherein the uplink control reporting indication includes at least one first index associated with one of the PUCCH resource sets corresponding to at least one second index for each part of the UCI.

Example 21: The method of example 20, wherein the at least one first index associated with one of the PUCCH resource sets directly corresponds to the at least one second index for each part of the UCI.

Example 22: The method of example 20, wherein the at least one first index associated with one of the PUCCH resource sets corresponds to the at least one second index for each part of the UCI according to at least one of an UCI index, an PUCCH resource set index, an PUCCH resource subset index, or a radio network temporary identifier (RNTI).

Example 23: The method of example 15, wherein transmitting the uplink control reporting indication comprises transmitting one or more downlink control messages, to the at least one UE, comprising one or more parts of the uplink control reporting indication.

Example 24: The method of example 15, wherein: transmitting the configuration of the PUCCH resource sets comprises transmitting the configuration of the PUCCH resource sets to the at least one UE via radio resource control signaling; and transmitting the uplink control reporting indication comprises transmitting the uplink control reporting indication to the at least one UE via downlink control signaling.

Example 25: The method of example 15, wherein the downlink DMRS port groups are used for non-coherent joint transmissions.

Example 26: The method of example 15, further comprising: determining transmit powers for the PUCCH resources associated with the downlink DMRS port groups; and transmitting an indication of the transmit powers to the at least one UE.

Example 27: The method of example 15, wherein the uplink control reporting indication includes time-domain offsets associated with the PUCCH resources to use for reporting the UCI.

Example 28: The method of example 15, further comprising selecting, based on reception powers of references signals received from the at least one UE, to generate the uplink control reporting indication and determine transmit powers for the PUCCH resources associated with the downlink DMRS port groups; and wherein generating the uplink control reporting indication comprises generating the uplink control reporting indication based on the selection.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 7-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication by a user equipment (UE), the method comprising:
    obtaining a configuration for physical uplink control channel (PUCCH) resource sets, each of the PUCCH resource sets comprising PUCCH resources, wherein obtaining the configuration for the PUCCH resource sets comprises receiving the configuration for the PUCCH resource sets via radio resource control signaling;
    obtaining signaling of an uplink control reporting indication indicating associations of the PUCCH resources with downlink demodulation reference signal (DMRS) port groups, wherein obtaining the signaling of the uplink control reporting indication comprises receiving the uplink control reporting indication via downlink control signaling;
    obtaining an indication of one or more transmit powers associated with the PUCCH resources;
    determining the PUCCH resources associated with the downlink DMRS port groups for one or more parts of uplink control information (UCI) also associated with the downlink DMRS port groups based on the configuration for the PUCCH resource sets and the uplink control reporting indication; and
    reporting the one or more parts of the UCI to at least one base station using the determined PUCCH resources and the indicated one or more transmit powers associated with the determined PUCCH resources.

2. The method of claim 1, wherein the uplink control reporting indication includes at least one first index associated with one of the PUCCH resource sets corresponding to at least one second index for each part of the UCI.

3. The method of claim 2, wherein the at least one first index associated with one of the PUCCH resource sets directly corresponds to the at least one second index for each part of the UCI.

4. The method of claim 2, wherein the at least one first index associated with one of the PUCCH resource sets corresponds to the at least one second index for each part of the UCI according to at least one of an UCI index, an PUCCH resource set index, an PUCCH resource subset index, or a radio network temporary identifier (RNTI).

5. The method of claim 2, wherein:
    the PUCCH resource sets include the PUCCH resources associated with at least one of the downlink DMRS port groups, and
    each of the PUCCH resource sets includes PUCCH resource subsets associated with different UCI payload sizes.

6. The method of claim 5, wherein reporting the one or more parts of the UCI comprises reporting the one or more parts of the UCI associated with the at least one of the downlink DMRS port groups using one of the PUCCH resources associated with the at least one of the downlink DMRS port groups within a PUCCH resource subset based on the at least one second index determined from the at least one first index and a payload size of the one or more parts of the UCI.

7. The method of claim 6, wherein the at least one first index includes a plurality of PUCCH resource indexes that indicate each of the PUCCH resources within the PUCCH resource subsets used to transmit each part of the UCI.

8. The method of claim 2, wherein the PUCCH resource sets include PUCCH resources associated with different UCI payload sizes.

9. The method of claim 8, wherein reporting the one or more parts of the UCI comprises reporting the one or more parts of the UCI associated with the at least one of the downlink DMRS port groups using at least one of the PUCCH resources associated with the at least one of downlink DMRS port groups within one of the PUCCH resource sets based on the at least one second index determined from the at least one first index and a payload size of the UCI.

10. The method of claim 9, wherein the at least one first index includes a plurality of PUCCH resource indexes that indicate each of the PUCCH resources within the PUCCH resource sets used to report each part of the UCI.

11. The method of claim 1, wherein obtaining the uplink control reporting indication comprises receiving one or more downlink control messages comprising one or more parts of the uplink control reporting indication.

12. The method of claim 1, wherein the downlink DMRS port groups are used for non-coherent joint transmissions.

13. The method of claim 1, wherein:
the uplink control reporting indication includes time-domain offsets associated with PUCCH resources to use for reporting the UCI; and
reporting the one or more parts of the UCI comprises reporting the one or more parts of the UCI using the time-domain offsets associated with the PUCCH resources.

14. A method of wireless communication by a base station (BS), the method comprising:
transmitting a configuration for physical uplink control channel (PUCCH) resource sets to at least one user equipment (UE), each of the PUCCH resource sets comprising PUCCH resources, wherein transmitting the configuration for the PUCCH resource sets comprises transmitting the configuration for the PUCCH resource sets via radio resource control signaling;
transmitting signaling of an uplink control reporting indication indicating associations of the PUCCH resources with downlink demodulation reference signal (DMRS) port groups, wherein transmitting the signaling of the uplink control reporting indication comprises transmitting the uplink control reporting indication via downlink control signaling;
transmitting an indication of one or more transmit powers associated with the PUCCH resources; and
receiving reporting of one or more parts of uplink control information (UCI) from the UE on PUCCH resources associated with the downlink DMRS port groups for the one or more parts of the UCI also associated with the downlink DMRS ports groups based on the configuration for the PUCCH resource sets and the uplink control reporting indication.

15. The method of claim 14, wherein each of the PUCCH resource sets are associated with different UCI payload sizes.

16. The method of claim 14, wherein transmitting the uplink control reporting indication comprises transmitting one or more downlink control messages, to the at least one UE, comprising one or more parts of the uplink control reporting indication.

17. The method of claim 14, wherein the downlink DMRS port groups are used for non-coherent joint transmissions.

18. The method of claim 14, wherein the uplink control reporting indication includes time-domain offsets associated with the PUCCH resources to use for reporting the UCI.

19. An apparatus for wireless communication, the apparatus comprising:
a transmitter configured to:
transmit a configuration for physical uplink control channel (PUCCH) resource sets to the at least one user equipment (UE), each of the PUCCH resource sets comprising PUCCH resources, wherein transmitting the configuration for the PUCCH resource sets comprises transmitting the configuration for the PUCCH resource sets via radio resource control signaling;
transmit signaling of an uplink control reporting indication indicating associations of the PUCCH resources with downlink demodulation reference signal (DMRS) port groups, wherein transmitting the signaling of the uplink control reporting indication comprises transmitting the uplink control reporting indication via downlink control signaling; and
transmit an indication of one or more transmit powers associated with the PUCCH resources; and
a receiver configured to receive reporting of one or more parts of uplink control information (UCI) from the UE on PUCCH resources associated with the downlink DMRS port groups for the one or more parts of the UCI also associated with the downlink DMRS ports groups based on the configuration for the PUCCH resource sets and the uplink control reporting indication.

20. An apparatus for wireless communication, the apparatus comprising:
a receiver configured to:
receive a configuration for physical uplink control channel (PUCCH) resource sets, each of the PUCCH resource sets comprising PUCCH resources, wherein receiving the configuration for the PUCCH resource sets comprises receiving the configuration for the PUCCH resource sets via radio resource control signaling;
receive signaling of an uplink control reporting indication indicating associations of the PUCCH resources with downlink demodulation reference signal (DMRS) port groups, wherein receiving the signaling of the uplink control reporting indication comprises receiving the uplink control reporting indication via downlink control signaling; and
receive an indication of one or more transmit powers associated with the PUCCH resources;
a processing system configured to determine the PUCCH resources associated with the downlink DMRS port groups for one or more parts of uplink control information (UCI) also associated with the downlink DMRS port groups based on the configuration for the PUCCH resource sets and the uplink control reporting indication; and
a transmitter configured to transmit the one or more parts of the UCI to at least one base station using the determined PUCCH resources and the indicated one or more transmit powers associated with the determined PUCCH resources.

* * * * *